(12) United States Patent
Tung et al.

(10) Patent No.: US 8,887,574 B2
(45) Date of Patent: Nov. 18, 2014

(54) MEASUREMENT SYSTEM FOR MEASURING PRESSURE OF FLUID AND MANUFACTURE METHOD THEREOF

(75) Inventors: Yi-Chung Tung, Taipei (TW); Chueh-Yu Wu, Kaohsiung (TW); Wei-Hao Liao, New Taipei (TW)

(73) Assignee: Academia Sinica, Taipei (TW)

( * ) Notice: Subject to any disclaimer, the term of this patent is extended or adjusted under 35 U.S.C. 154(b) by 453 days.

(21) Appl. No.: 13/314,957

(22) Filed: Dec. 8, 2011

(65) Prior Publication Data
US 2013/0019688 A1      Jan. 24, 2013

(30) Foreign Application Priority Data

Jul. 21, 2011   (TW) ................ 100125798 A

(51) Int. Cl.
G01L 9/02    (2006.01)
G01L 9/00    (2006.01)
B01L 3/00    (2006.01)

(52) U.S. Cl.
CPC .............. G01L 9/0058 (2013.01); B01L 3/5027 (2013.01)
USPC ................................ 73/719; 73/715; 73/753

(58) Field of Classification Search
None
See application file for complete search history.

(56) References Cited

U.S. PATENT DOCUMENTS

| | | | | |
|---|---|---|---|---|
| 3,942,382 A | * | 3/1976 | Hok ................................ | 73/753 |
| 4,113,528 A | * | 9/1978 | Tokuoka et al. .............. | 148/105 |
| 4,172,387 A | * | 10/1979 | Ezekiel et al. ................... | 73/719 |
| 5,522,556 A | * | 6/1996 | Knepler et al. .................. | 241/34 |
| 7,191,659 B2 | * | 3/2007 | Aratani et al. ................... | 73/715 |
| 7,562,580 B2 | * | 7/2009 | Rezgui et al. .................... | 73/716 |
| 7,950,761 B2 | * | 5/2011 | Komatsu et al. ................ | 347/11 |
| 8,075,098 B2 | * | 12/2011 | Yamashita ....................... | 347/50 |

OTHER PUBLICATIONS

Wu, et al., "A Seamlessly Integrated Microfluidic Pressure Sensor Based on an Ionic Liquid Electrofluidic Circuit", IEEE MEMS (Jan. 23-27, 2011), pp. 1087-1090, Cancun, Mexico.
Kartalov, et al., "Electrical Microfluidic Pressure Gauge for Elastomer Microelectromechanical Systems", Journal of Applied Physics, (Oct. 26, 2007) pp. 084909-1-084909-4, vol. 102.

(Continued)

*Primary Examiner* — Lisa Caputo
*Assistant Examiner* — Jermaine Jenkins
(74) *Attorney, Agent, or Firm* — Muncy, Geissler Olds & Lowe, P.C.

(57) ABSTRACT

A measurement system for measuring a pressure of a fluid is provided. The measurement system includes a sensing module and a liquid electrical circuit. The sensing module includes a flexible film and a liquid electronic device. The flexible film has a first side and a second side opposite to the first side. The fluid is disposed on the first side of the flexible film, and the liquid electronic device is disposed on the second side of the flexible film. The flexible film converts the pressure of the fluid into a parameter of the liquid electronic device. The liquid electrical circuit is electrically coupled to the liquid electronic device. The liquid electronic device and the liquid electrical circuit output a measurement signal corresponding to the parameter in response to an applied electrical energy. A manufacture method of a measurement system is also provided.

19 Claims, 10 Drawing Sheets

(56) References Cited

OTHER PUBLICATIONS

Le, et al., "Design and Implementation of an Optimised Wireless Pressure Sensor for Biomedical Application", Analog Integr. Circ. Sig. Process, (Dec. 22, 2005) pp. 21-31, vol. 48.

Hosokawa, et al., "A Polydimethylsiloxane (PDMS) Deformable Diffraction Grating for Monitoring of Local Pressure in Microfluidic Devices", J. Micromech. Microeng. (Dec. 11, 2001) 1-6, vol. 12.

Chung, et al., "Multiplex Pressure Measurement in Microsystems Using Volume Displacement of Particle Suspensions", The Royal Society of Chemistry, Lab Chip, (Sep. 30, 2009) pp. 3345-3353, vol. 9.

Wu, et al., "Integrated Ionic Liquid-Based Electrofluidic Circuits for Pressure Sensing Within Polydimethylsiloxane Microfluidic Systems", The Royal Society of Chemistry, Lab Chip, Downloaded by Academia Sinica—Taipei on Apr. 6, 2011, (Published on Mar. 30, 2011), on http://pubs.rsc.org, pp. 1-7, DOI:10.1039/C0LC00620C.

Wang, et al., "Polydimethylsiloxane-Integratable Micropressure Sensor for Microfluidic Chips", Biomicrofluidics, (Sep. 17, 2009), pp. 034105-1-034105-8, vol. 3.

Chang, et al., "A Flexible Piezoelectric Sensor for Microfluidic Applications Using Polyvinylidene Fluoride", IEEE Sensors Journal, (May 2008) pp. 495-500, vol. 8, No. 5.

\* cited by examiner

MEASUREMENT SYSTEM FOR MEASURING PRESSURE OF FLUID AND MANUFACTURE METHOD THEREOF

CROSS REFERENCE TO RELATED APPLICATIONS

This Non-provisional application claims priority under 35 U.S.C. §119(a) on Patent Application No(s). 100125798 filed in Taiwan, Republic of China on Jul. 21, 2011, the entire contents of which are hereby incorporated by reference.

BACKGROUND OF THE INVENTION

1. Field of Invention

The present invention relates to a measurement system and a manufacture method thereof. In particularly, the present invention relates to a measurement system for a pressure of a fluid and a manufacture method thereof.

2. Related Art

Pressure sensors are essential components in various microfluidic systems, which accelerate the lab on a chip research. The capabilities of controlling and monitoring the pressure make it possible to enable precise spatiotemporal controls, and better understanding of the fundamental phenomena in the microfluidics. Numerous microfluidic devices have created advanced chemical and biomedical applications using pressure manipulation. For instance, pressure can be applied to enable the transfer of biological and chemical samples to specific locations at desired time points, manipulate particles in flows, and separate materials. In addition, precise pressure sensing can be used for advanced microfluidic feedback control and cellular mechanical measurement. Consequently, pressure control and monitor dominate the performance and efficiency of chemical synthesis, DNA analysis, cell stimulus, and cellular microenvironmental construction using the microfluidic technology.

Several materials have been used to develop microfluidic devices, and wide range of material properties has made polymers become popular. An elastomeric material, polydimethylsiloxane (PDMS), has several advantages: optical transparency, great mechanical properties, great manufacturability, and biocompatibility. Therefore, it has been widely utilized for a large number of modern microfluidic devices. As a result, precise pressure sensing in the PDMS devices plays an important role for PDMS microfluidic devices with advanced control and analysis.

SUMMARY OF THE INVENTION

The present invention is to provide a measurement system with better stability.

The present invention is also to provide a manufacture method of a measurement system with the liquid electronic device and liquid electrical circuit.

One embodiment of the present invention discloses a measurement system for measuring a pressure of a fluid. The measurement system includes a sensing module and a liquid electrical circuit. The sensing module includes a flexible film and a liquid electronic device. The flexible film has a first side and a second side opposite to the first side, and the fluid is disposed on the first side of the flexible film. The liquid electronic device is disposed on the second side of the flexible film. The flexible film converts the pressure of the fluid into a parameter of the liquid electronic device. The liquid electrical circuit is electrically coupled to the liquid electronic device. The liquid electronic device and the liquid electrical circuit output a measurement signal corresponding to the parameter in response to an applied electrical energy.

Another embodiment of the present invention discloses a manufacture method of a measurement system. The manufacturing method includes the following steps of: forming a first container having a first space; forming a second container having a second space; forming a flexible film, wherein the first container and the second container are connected to two opposite sides of the flexible film such that the first space and the second space are communicated with the two opposite sides of the flexible film; and filling an ionic liquid in the second space to form a liquid electronic device and a liquid electrical circuit electrically coupled with the liquid electronic device, wherein the liquid electronic device is disposed on the flexible film.

As mentioned above, the measurement system of the invention is configured with a liquid electronic device and a liquid electrical circuit. Since the characteristics of the liquid electronic device and liquid electrical circuit are not affected by the temperature variation relatively, the measurement system of the invention has better stability, which makes the long-term operation of the measurement system possible. In addition, the manufacture method of the measurement system of the invention includes the step of filling the ionic liquid into the second space, so that the measurement system with higher stability and capable of long-term operation is available.

These and other features, aspects and advantages of the present invention will become better understood with regard to the following description, appended claims, and accompanying drawings.

DETAILED DESCRIPTION OF THE INVENTION

The present invention will be apparent from the following detailed description, which proceeds with reference to the accompanying drawings, wherein the same references relate to the same elements.

Figure 1:
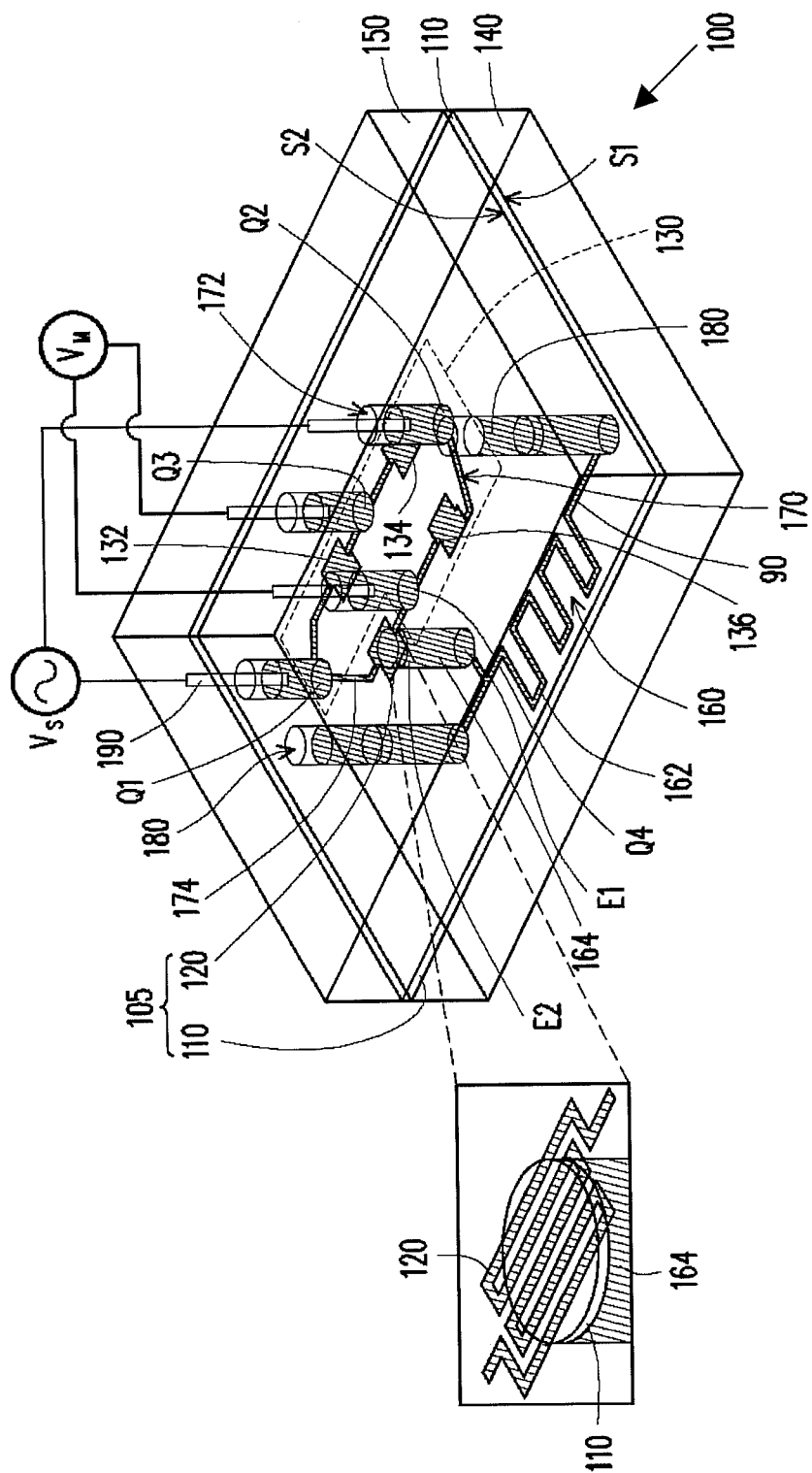
FIG. 1 is a perspective view of a measurement system according to an embodiment of the present invention.
Figure 2:
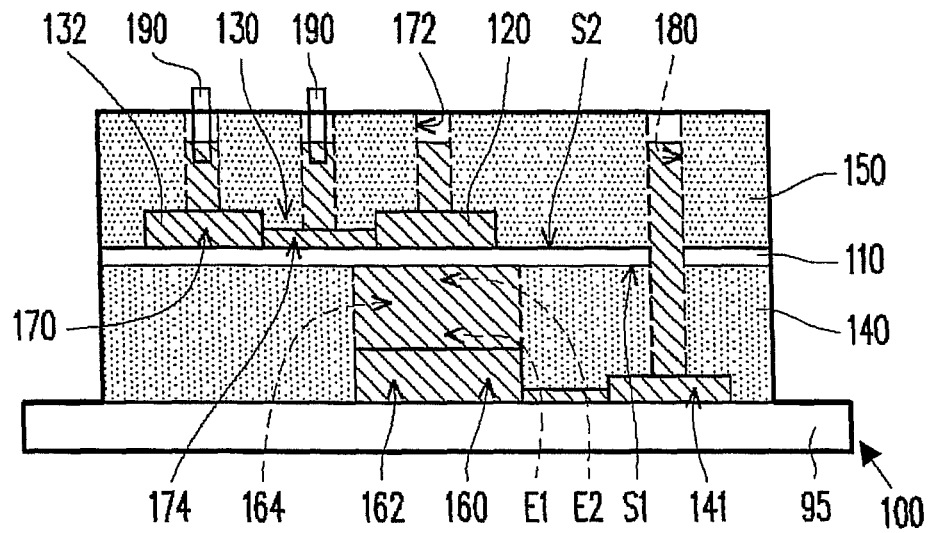
FIG. 2 is a cross-section view of the measurement system of FIG. 1.
Figure 3A:
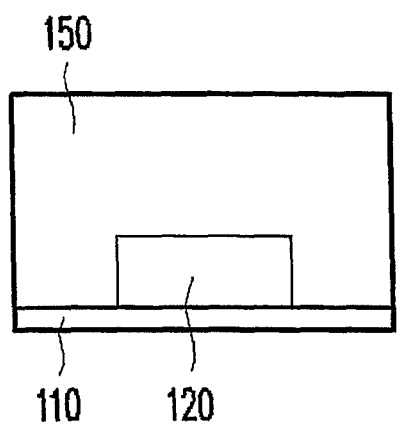
FIG. 3A and FIG. 3B are schematic diagrams showing the actions of the flexible film of FIG. 1.
Figure 3B:
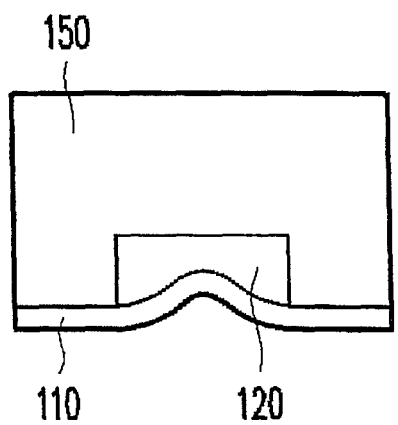
Figure 4:
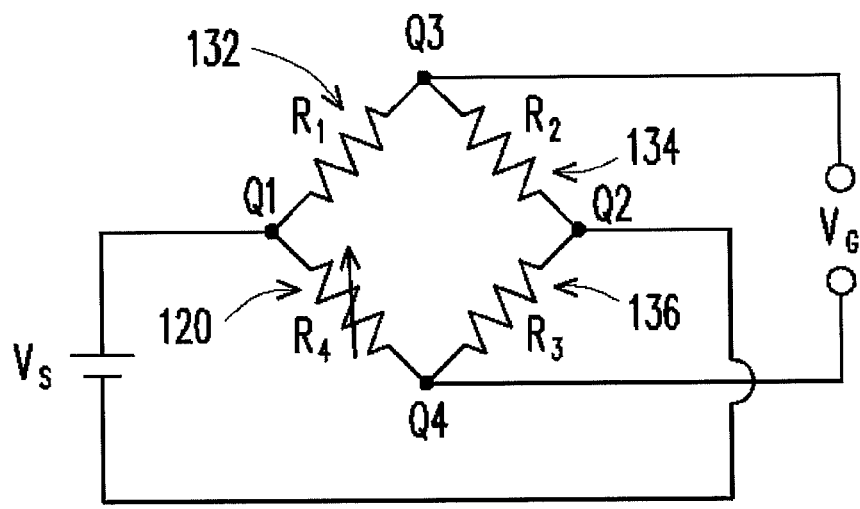
FIG. 4 is a schematic diagram showing the equivalent circuit diagram of the measurement system of FIG. 1.

FIG. 1 is a perspective view of a measurement system according to an embodiment of the present invention, FIG. 2 is a cross-section view of the measurement system of FIG. 1, FIG. 3A and FIG. 3B are schematic diagrams showing the actions of the flexible film of FIG. 1, and FIG. 4 is a schematic diagram showing the equivalent circuit diagram of the measurement system of FIG. 1. With reference to FIGS. 1 and 2, a measurement system 100 of the embodiment is used to measure the pressure of a fluid 90. The measurement system 100 includes a sensing module 105 and a liquid electrical circuit 130. The sensing module 105 includes a flexible film 110 and a liquid electronic device 120. The flexible film 110 has a first side S1 and a second side S2 opposite to the first side S1. The fluid 90 is disposed on the first side S1 of the flexible film 110, and the liquid electronic device 120 is disposed on the second side S2 of the flexible film 110. The flexible film 110 converts the pressure of the fluid 90 into a parameter of the liquid electronic device 120. The liquid electrical circuit 130 is electrically coupled to the liquid electronic device 120. The liquid electronic device 120 and the liquid electrical circuit 130 output a measurement signal corresponding to the parameter in response to an applied electrical energy.

In this embodiment, the measurement system 100 further includes a first container 140 and a second container 150. The first container 140 is disposed on the first side S1 of the flexible film 110 and has a first space 160 for accommodating the fluid 90. The second container 150 is disposed on the second side S2 of the flexible film 110 and has a second space 170 for accommodating the liquid electronic device 120 and the liquid electrical circuit 130. In addition, the liquid electronic device 120 includes an ionic liquid, and the liquid electrical circuit 130 also includes an ionic liquid. In particularly, the liquid electronic device 120 and the liquid electrical circuit 130 are configured by the ionic liquid accommodated in the second space 170. In the present embodiment, the ionic liquid may include, for example, BMIM-$PF_6$ (1-Butyl-3-methylimidazolium hexafluorophosphate), ethylammonium nitrate, or other salts with a melting point lower than room temperature. In this embodiment, the material of the first container 140, the second container 150, and the flexible film 110 may include poly-dimethylsiloxane (PDMS), polyurethane (PU), or other flexible materials. Besides, the material of the first container 140 and the second container 150 may be the same as or different from that of the flexible film 110. Alternatively, the first container 140 and the second container 150 may be made of a rigid material, and the flexible film 110 may be made of a flexible material. In addition, the first space 160 includes a channel 162 and a through hole 164. The channel 162 is used for accommodating the fluid 90. The through hole 164 has a first end E1 and a second end E2 opposite to each other. Herein, the first end E1 is communicated with the channel 162, and the second end E2 is communicated with the flexible film 110. The fluid 90 flows through the through hole 164 and applies the pressure to the flexible film 110. However, in alternative embodiments, the channel 162 may not communicate with the flexible film 110 via the through hole 164. For example, the flexible film 110 may be configured as part of the side wall of the channel 162. That is, the fluid 90 flowing in the channel 162 can directly contact with the flexible film 110 so as to apply pressure to it. In this embodiment, the channel 162 has a circuitous configuration. However, in alternative embodiments, the channel 162 may have different configurations. Otherwise, the channel 162 may be substituted by a fluid storage.

In this embodiment, the liquid electronic device 120 and the liquid electrical circuit 130 output the measurement signal corresponding to the parameter in response to an applied voltage $V_S$, and the liquid electronic device 120 and the liquid electrical circuit 130 form a closed loop.

Referring to FIGS. 1, 3A and 3B, in this embodiment, the pressure of the fluid 90 can cause the deformation of the flexible film 110, in particular, the portion of the flexible film 110 located at the liquid electronic device 120. The deformation of the flexible film 110 can cause the deformation of the liquid electronic device 120, and then the deformation of the liquid electronic device 120 can cause the change of the resistance value of the liquid electronic device 120. In specific, when the pressures of the fluid 90 and the ionic liquid are equal to each other, the deformation of the flexible film 110 is not occurred (see FIG. 3A). Otherwise, when the pressure of the fluid 90 is larger than that of the ionic liquid, the net pressure obtained by subtracting the pressure of the ionic liquid from the pressure of the fluid 90 can push the flexible film 110 bended toward the liquid electronic device 120, thereby reducing the cross-section area of the liquid electronic device 120 (see FIG. 3B). When the cross-section area of the liquid electronic device 120 is reduced, the resistance value of the liquid electronic device 120 is correspondingly increased.

In this embodiment, the liquid electronic device 120 and the liquid electrical circuit 130 form, for example but not limited to, a Wheatstone bridge. Alternatively, the liquid electronic device 120 and the liquid electrical circuit 130 may form a circuitry that can output the measurement signal indicating the resistance change of the liquid electronic device 120.

In this embodiment, the liquid electrical circuit 130 includes a first liquid resistance device 132, a second liquid resistance device 134, and a third liquid resistance device 136. The first liquid resistance device 132 is electrically coupled to the liquid electronic device 120. The second liquid resistance device 134 is electrically coupled to the first liquid resistance device 132. The third liquid resistance device 136 is electrically coupled between the liquid electronic device 120 and the second liquid resistance device 134, while the liquid electronic device 120 is, for example, a fourth liquid resistance device. In this case, the first liquid resistance device 132, the second liquid resistance device 134, the third liquid resistance device 136, and the liquid electronic device 120 have a circuitous configuration for increasing the resistance values thereof. In other words, in this embodiment, the second container 150 has four channels for accommodating the first liquid resistance device 132, the second liquid resistance device 134, the third liquid resistance device 136, and the liquid electronic device 120, and the four channels are all circuitous. Thus, at least one of the first liquid resistance device 132, the second liquid resistance device 134, the third liquid resistance device 136, and the liquid electronic device 120 is circuitous. FIG. 1 shows the circuitous liquid electronic device 120, and the configurations of the first liquid resistance device 132, the second liquid resistance device 134, and the third liquid resistance device 136 are similar to the circuitous liquid electronic device 120. In addition, the channels 174 are configured between the liquid electronic device 120 and the first liquid resistance device 132, between the first liquid resistance device 132 and the second liquid resistance device 134, between the second liquid resistance device 134 and the third liquid resistance device 136, and between the third liquid resistance device 136 and the liquid electronic device 120, so that the first liquid resistance device 132, the second liquid resistance device 134, the third liquid resistance device 136, and the liquid electronic device 120 can communicated with each other. Herein, the channels 174 also contain the ionic liquid.

The voltage $V_S$ is applied between a first node Q1 and a second node Q2. The first node Q1 is coupled between the first liquid resistance device 132 and the liquid electronic device 120 (or the fourth liquid resistance device), and the second node Q2 is coupled between the second liquid resistance device 134 and the third liquid resistance device 136. The measurement signal corresponds to the voltage difference between a third node Q3 and a fourth node Q4. The third node Q3 is coupled between the first liquid resistance device 132 and the second liquid resistance device 134, and the fourth node Q4 is coupled between the third liquid resistance device 136 and the liquid electronic device 120 (or the fourth liquid resistance device). In this embodiment, the measurement signal is the voltage difference between the third node Q3 and the fourth node Q4, which can be measured by a voltmeter $V_M$ coupled to the third node Q3 and the fourth node Q4.

Reference to FIGS. 1, 3A, 3B and 4, in this embodiment, the first liquid resistance device 132 has a resistance value $R_1$, the second liquid resistance device 134 has a resistance value $R_2$, the third liquid resistance device 136 has a resistance value $R_3$, and the liquid electronic device 120 (or the fourth liquid resistance device) has a resistance value $R_4$. The measurement signal is the voltage difference $V_G$ between the third node Q3 and the fourth node Q4. According to Kirchhoff's voltage and circuit laws, while the resistance values $R_1$, $R_2$ and $R_3$, are substantially equivalent, the voltage difference $V_G$ can be given by:

$$V_G = \left(\frac{1}{2} - \frac{R_1}{R_1 + R_4}\right) V_S \quad (1)$$

According to Ohm's law, the resistance value $R_4$ of the liquid electronic device 120 can be given by:

$$R_4 = \rho \frac{L}{A} \quad (2)$$

Wherein, $\rho$ is the resistivity, L is the length of the channel for accommodating the liquid electronic device 120, and A is the cross-section area of the channel for accommodating the liquid electronic device 120.

While the pressure of the fluid 90 changes, the cross-section area A of the channel for accommodating the liquid electronic device 120 (or the cross-section area of the liquid electronic device 120) generates an area variation $\Delta A$. Since the area variation $\Delta A$ is very small compared to the initial cross-section area of the liquid electronic device 120 while the flexible film 110 is not deformed (see FIG. 3A). According the above equation (2), the variation $\Delta R_4$, while the area variation $\Delta A$ is generated, can be obtained as follow:

$$\Delta R_4 = \left(\frac{\rho L}{A^2}\right) \cdot \Delta A \quad (3)$$

In this embodiment, when the flexible film 110 is not deformed, the liquid electronic device 120 has a resistance value $R_1$. Since the variation $\Delta R_4$ is very small compared to the resistance value $R_1$, the voltage difference $\Delta V_G$, according to the above equation (1), can be given by:

$$\Delta V_G = \left[\frac{1}{2} - \frac{R_1}{(R_1 + \Delta R_4) + R_1}\right] \cdot V_S = \left(\frac{\frac{1}{2} \cdot \Delta R_4}{2R_1 + \Delta R_4}\right) \cdot V_S \approx \left(\frac{V_S}{4R_1}\right) \cdot \Delta R_4 \quad (4)$$

Combining equations (3) and (4), the voltage difference $\Delta V_G$ can be written as:

$$\Delta V_G = \left(\frac{V_S}{4R_1}\right) \cdot \left(\frac{\rho L}{A^2}\right) \cdot \Delta A \quad (5)$$

According to equation (5), the area variation $\Delta A$ of the liquid electronic device 120 can be calculated based on the measured voltage difference $\Delta V_G$, and then the pressure variation of the fluid 90 can be obtained based on the calculated area variation $\Delta A$. In other words, the pressure of the fluid 90 can be obtained after measuring the measuring signal $V_G$ outputted from the measurement system 100 of the embodiment. Consequently, the measurement system 100 of the embodiment can measure the pressure of the fluid 90.

In order to decrease the accumulated charges in the liquid electronic device 120 and the liquid electrical circuit 130, the applied voltage $V_S$ of this embodiment is an AC voltage. In this case, the measuring signal $V_G$ is also an AC signal, and the pressure of the fluid 90 can be calculated according to the amplitude changes of the measuring signal $V_G$. Consequently, no matter the applied voltage $V_S$ is an AC voltage or a DC voltage, the measurement system 100 can measure the pressure of the fluid 90.

In this embodiment, the second container 150 may further include a plurality of through holes 172 for communicating with the space 170. The through holes 172 can be used as the injection hole of the ionic liquid. In this embodiment, the measurement system 100 may further include a plurality of electrodes 190 electrically connected with the liquid electronic device 120 and the liquid electrical circuit 130. In specific, the electrodes 190 are immersed into the ionic liquid for electrically connecting with the ionic liquid. In this embodiment, four through holes 172 are configured and communicated with the first node Q1, the second node Q2, the third node Q3 and the fourth node Q4 respectively. Four electrodes 190 are respectively immersed into the ionic liquids in the four through holes 172 for electrically connecting to the first node Q1, the second node Q2, the third node Q3 and the fourth node Q4 respectively. In addition, two electrodes 190 electrically connecting to the first node Q1 and the second node Q2 can be coupled to the applied voltage $V_S$ through wires or other conductive circuit, and the other two electrodes 190 electrically connecting to the third node Q3 and the fourth node Q4 can be coupled to two ends of the voltmeter $V_M$ through wires or other conductive circuit, The measurement system 100 of the embodiment is configured with the liquid electronic device 120 and the liquid electrical circuit 130, which are formed by ionic liquid. Since the characteristics (e.g. conductivity) of the ionic liquid are not affected by the temperature variation relatively, the characteristics (e.g. resistance value) of the liquid electronic device 120 and the liquid electrical circuit 130 are not affected by the temperature variation. Accordingly, the measurement system 100 can have better stability and it is suitable for long-term operation. In addition, the measurement system 100 of this embodiment adopts the Wheatstone bridge configuration, so that when the resistance value of the liquid electronic device 120 changes slightly with respect to the temperature variation, the first liquid resistance device 132, the second liquid resistance device 134 and the third liquid resistance device 136 can have similar changes. Thus, the cross voltage of the four devices as well as the measurement signal $V_G$ does not change very much. This feature can remain the measurement signal $V_G$ without being affected by temperature, so that the measurement system 100 can have better stability and is suitable for long-term operation. In addition, since the ionic liquid has the ability of absorbing moisture, the ionic liquid in the measurement system 100 can not be evaporated to dry. This feature also allows the measurement system 100 to have good stability and reliability after long-term operation.

Figure 5:
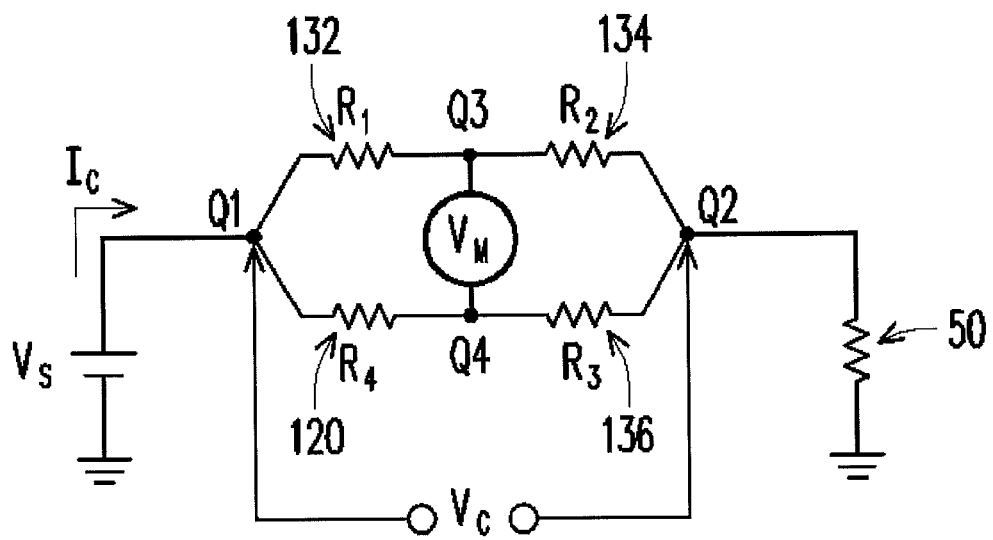
FIG. 5 is a schematic diagram showing the equivalent circuit for measuring the current-voltage curve of the measurement system of FIG. 1.
Figure 6A:
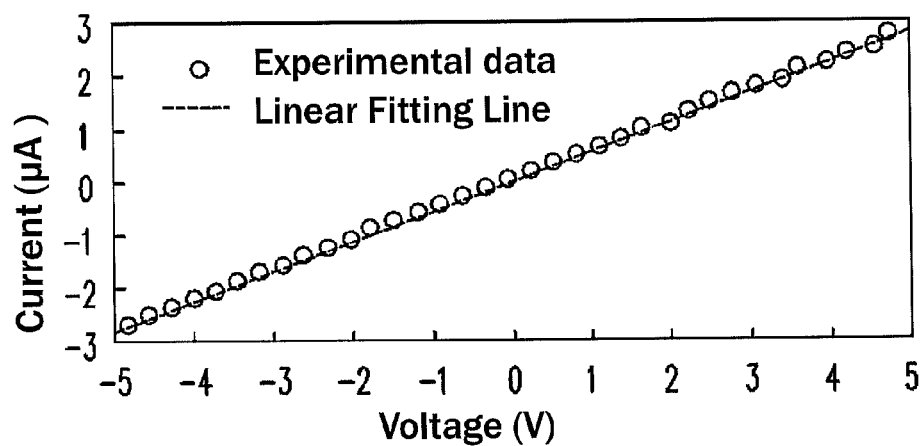
FIG. 6A is a schematic graph showing the measuring result of the current-voltage curve characterization of the measurement system by using the circuit of FIG. 5.

FIG. 5 is a schematic diagram showing the equivalent circuit for measuring the current-voltage curve of the measurement system of FIG. 1, and FIG. 6A is a schematic graph showing the measuring result of the current-voltage curve characterization of the measurement system by using the circuit of FIG. 5. Referring to FIGS. 5 and 6A, the measurement system 100 is connected to a resistor 50 in series for analyzing the current-voltage curve characterization of the measurement system 100. As shown in FIG. 6A, after applying different voltages $V_S$, the relations between the total current $I_C$ flowing into the measurement system 100 and the voltage differences $V_C$ between the first node Q1 and the second node Q2. In FIG. 6A, the circles represent the experimental data, and the dotted line represents a linear fitting line of these measured data. According to FIG. 6A, the current-voltage curve characterization of the measurement system 100 is linear with a correlation coefficient $R^2$ larger than or equal to 0.998. Consequently, as shown in FIG. 6A, if the applied voltage ranges from −5 to 5 volts, the outputted measurement signals of the fluid 90 and the measurement system 100 have good linearity.

Figure 6B:
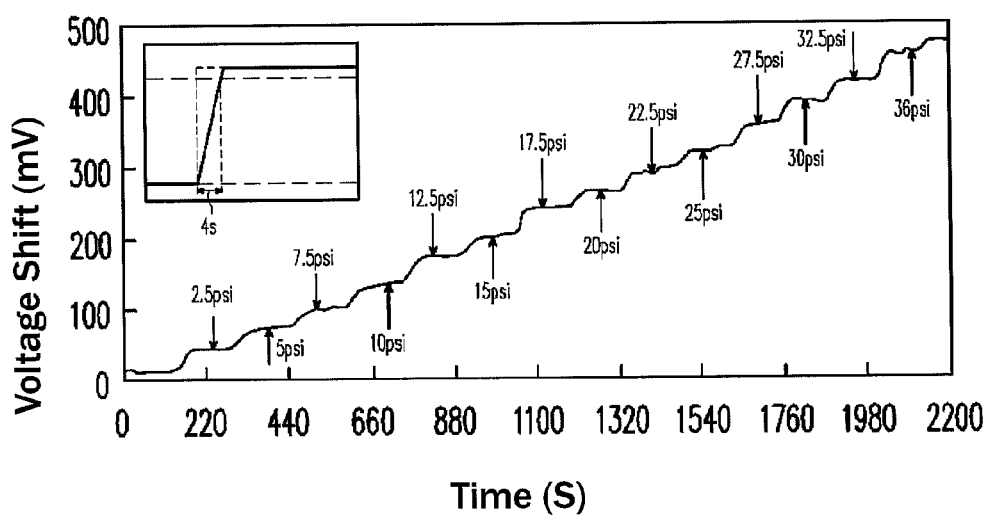
FIG. 6B is a schematic graph showing the measurement result for a 2.5 psi step function pressure input.

FIG. 6B is a schematic graph showing the measurement result for a 2.5 psi step function pressure input. FIG. 6B shows the pressure values of 2.5 psi, 5 psi, 7.5 psi, 10 psi, and so on, which mean that the fluid 90 remains in a pressure of 2.5 psi for a period, then the pressure of the fluid 90 is increased to 5 psi and the fluid remains in the pressure of 5 psi for a period, and then the pressure of the fluid 90 is increased to 7.5 psi and the fluid remains in the pressure of 7.5 psi for a period, and so on. As shown in FIG. 6B, when the pressure of the fluid 90 is increased for a while, the voltage value of the measurement signal outputted by the measurement system 100 (or the voltage difference between the third node Q3 and the fourth node Q4) becomes steady. FIG. 6B also shows that the period from the point that the pressure of the fluid 90 is increased to the point that the voltage value of the measurement signal becomes steady is about 4 seconds. As a result, the response time of the measurement system 100 with respect to the fluid 90 is fast.

Figure 6C:
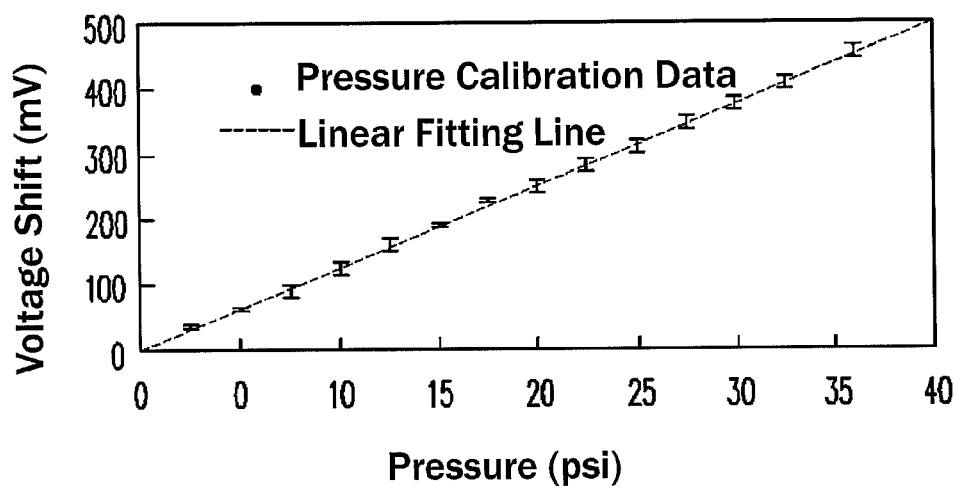
FIG. 6C is a schematic graph showing the relation between the voltage value of the measurement signal and the pressure of the fluid after the voltage value of the measurement signal and the pressure of the fluid shown in FIG. 6B become steady.

FIG. 6C is a schematic graph showing the relation between the voltage value of the measurement signal and the pressure of the fluid after the voltage value of the measurement signal and the pressure of the fluid shown in FIG. 6B become steady. The relation curve of FIG. 6C can be obtained according to the calibration method used in FIG. 6B (the pressure of the fluid 90 is increased by 2.5 psi for several times), wherein the symbol "I" represents the difference between the voltage data with the pressure calibration and the linear fitting line. As shown in FIG. 6B, the measurement system 100 of the embodiment can output the voltage values of the measurement signals with highly linear relation with the pressures of the fluid. In this experiment, the correlation coefficient $R^2$ is larger than or equal to 0.999.

Figure 6D:
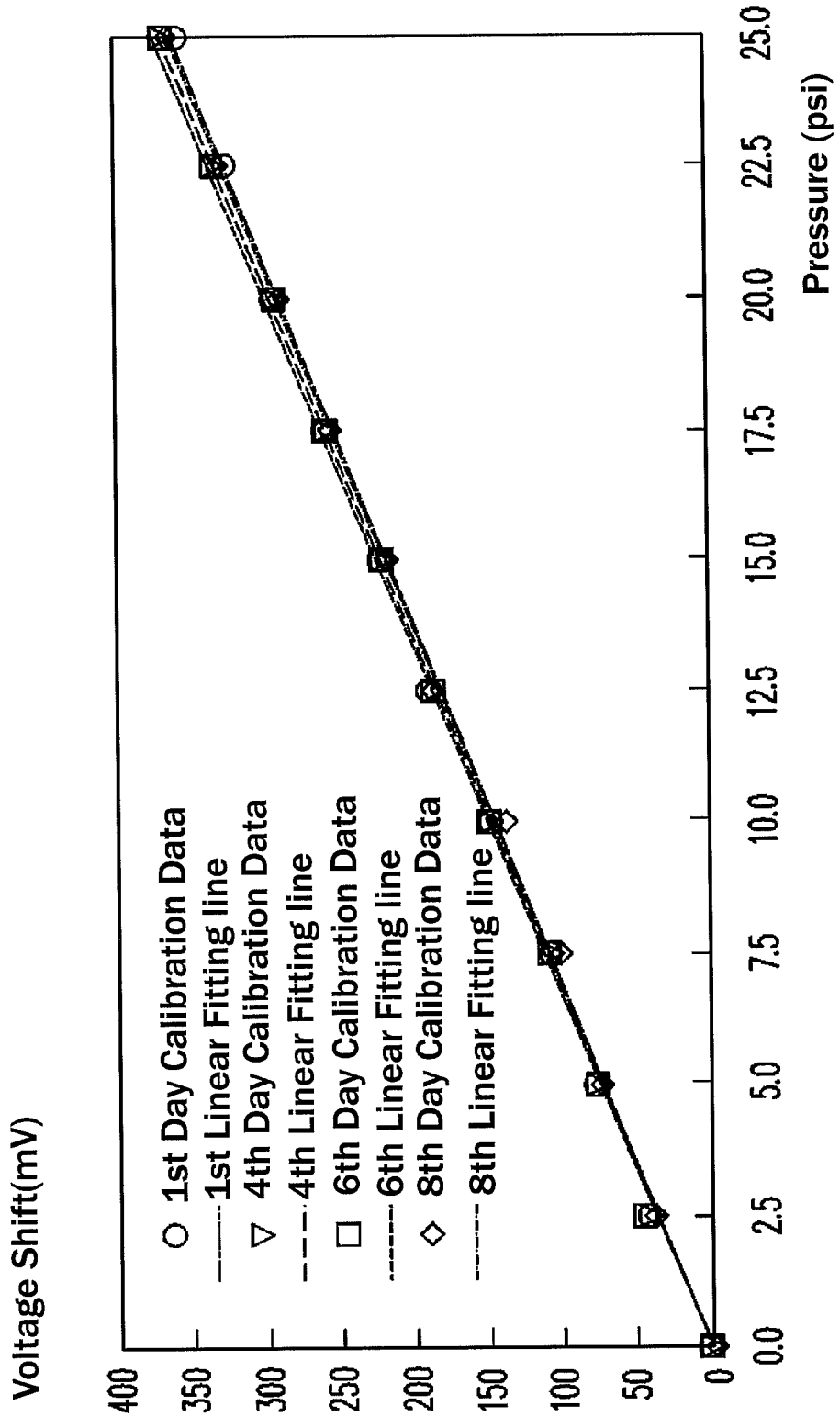
FIG. 6D is a schematic graph showing the relationship between the voltage values of the measurement signals and the pressures of the fluid of the measurement system of FIG. 1 within an eight day operation.

FIG. 6D is a schematic graph showing the relationship between the voltage values of the measurement signals and the pressures of the fluid of the measurement system of FIG. 1 within an eight day operation. Referring to FIGS. 1 and 6D, the circles represents the experimental data in the first day, the reverse triangles represents the experimental data in the fourth day, the squares represents the experimental data in the sixth day, the diamonds represents the experimental data in the eighth day, and the four dotted lines represent the linear fitting lines of the experimental data in the first, fourth, sixth and eighth days. The experimental data shown in FIG. 6D do not have obvious variations, which means that the measurement system 100 has good stability and can be operated for a long time.

Figure 6E:
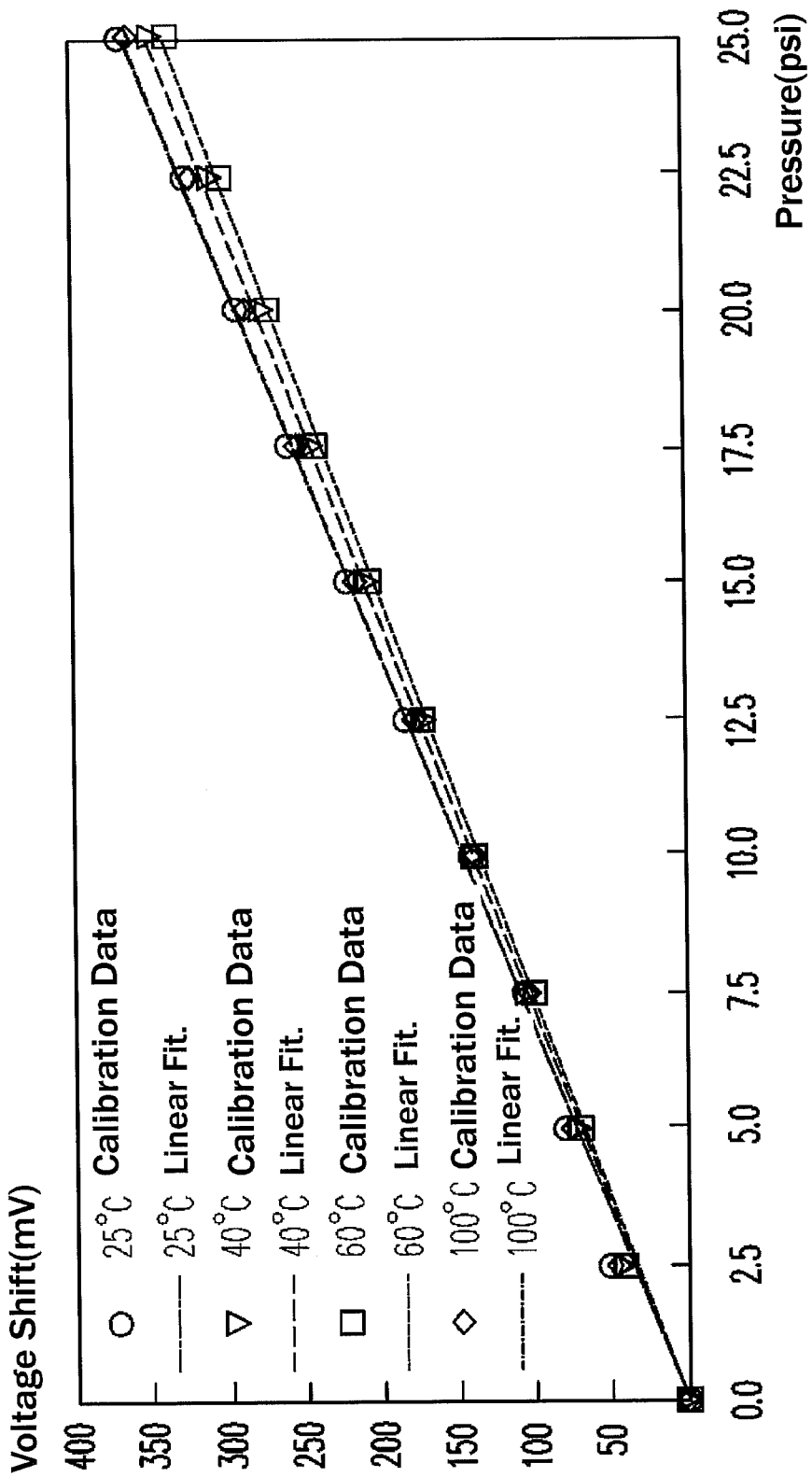
FIG. 6E is a schematic graph showing the relationship between the voltage values of the measurement signals and the pressures of the fluid under different temperatures.

FIG. 6E is a schematic graph showing the relationship between the voltage values of the measurement signals and the pressures of the fluid under different temperatures. Referring to FIGS. 1 and 6E, the circles represents the experimental data of the measurement system 100 operating at 25° C., the reverse triangles represents the experimental data of the measurement system 100 operating at 40° C., the squares represents the experimental data of the measurement system 100 operating at 60° C., the diamonds represents the experimental data of the measurement system 100 operating at 100° C., and the four dotted lines represent the linear fitting lines of the experimental data of the measurement system 100 operating at 25° C., 40° C., 60° C. and 100° C. The experimental data of the measurement system 100 operating under different temperatures shown in FIG. 6E do not have obvious variations, which means that the measurement system 100 does not affected by the change of the operation temperature.

In this embodiment, the fluid 90 is for example a static fluid 90 and is gas or liquid. However, the fluid 90 may also be a dynamic fluid. In this case, the measurement system 100 must continuously output the measurement signal so as to achieve the real-time monitoring of the dynamic fluid 90. Besides, the numbers of the liquid electronic device 120 and the liquid electrical circuit 130 of the measurement system 100 are not limited to the above embodiment. Alternatively, the measurement system 100 may include several sets of the liquid electronic device 120 and the liquid electrical circuit 130 for multiple measuring. For example, it is possible to measure the pressures of the fluid 90 at different locations in the channel. When the liquid electronic device 120 and the liquid electrical circuit 130 are small, several sets of the liquid electronic devices 120 and the liquid electrical circuits 130 can be integrated in the measurement system 100 for achieving the desired multiple measuring.

Figure 7A:
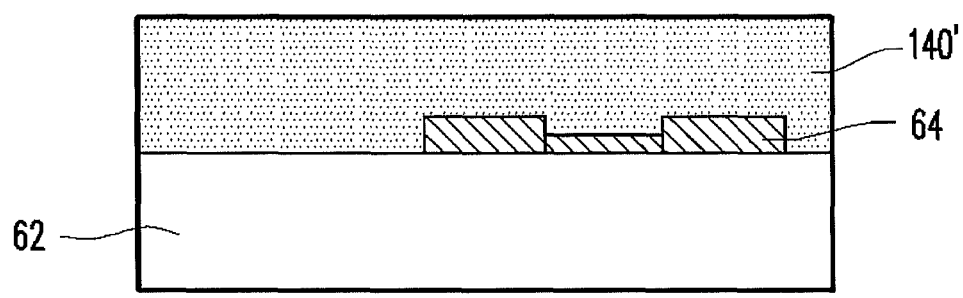
FIG. 7A to FIG. 7F are cross-section views showing the manufacture method of the measurement system according to the embodiment of the present invention.
Figure 7B:
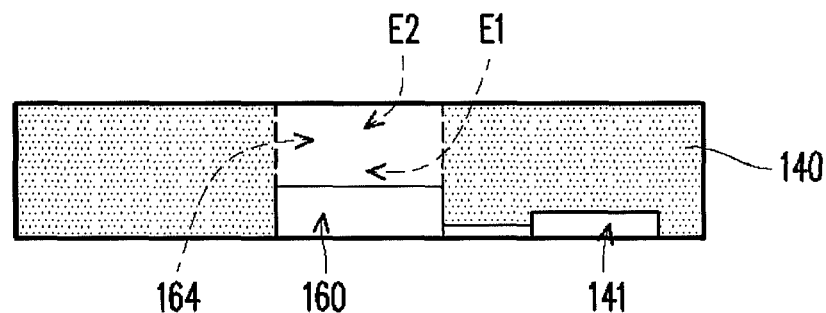

FIG. 7A to FIG. 7F are cross-section views showing the manufacture method of the measurement system according to the embodiment of the present invention. With reference to FIGS. 7A to 7F, 1 and 2, the manufacture method of the invention can be used to manufacture the measurement system 100 of FIGS. 1 and 2. The manufacture method of the measurement system includes the following steps. Referring to FIGS. 7A and 7B, the first step of the manufacture method is to form a first container 140, which has a first space 160.

In this embodiment, the step of forming the first container 140 includes the following steps. First, referring to FIG. 7A, a first substrate 62 is provided. In this embodiment, the first substrate 62 is, for example, a silicon substrate. However, the first substrate 62 can also be made of other proper materials. Next, a first patterned structure 64 is formed on the first substrate 62. In this embodiment, the material of the first patterned structure 64 includes photoresist materials. In practice, a photoresist layer is applied on the entire surface of the first substrate 62, and then the photoresist layer is processed by photolithograph and developing processes to form the first patterned structure 64 with the preset pattern. After that, a first material layer 140' is applied on the first substrate 62 and covers the first patterned structure 64. Then, the first material layer 140' is solidified to form the first container 140 (see FIG. 7B). The first container 140 has a first recess 141 corresponding to the first patterned structure 64. In other words, the first recess 141 and the first patterned structure 64 can match and compensate to each other.

Next, as shown in FIG. 7B, the first container 140 is departed from the first substrate 62 and the first patterned structure 64. In this embodiment, after the first patterned structure 64 is formed on the first substrate 62 and before the first material layer 140' is applied on the first substrate 62, a surface treatment can be applied to the first substrate 62 and the first patterned structure 64, so that the first container 140 can be easily departed from the first substrate 62 and the first patterned structure 64 in the step referring to FIG. 7B. In one embodiment, the surface treatment is for example a silanization process. In this embodiment, the first recess 160 includes the first recess 141.

In this embodiment, after the first material layer 140' is solidified, a through hole 164 communicating with the first recess 141 is formed in the first container 140. The through hole 164 has a first end E1 and a second end E2 opposite to each other, and the first end E1 is communicated with the first recess 141.

Figure 7C:
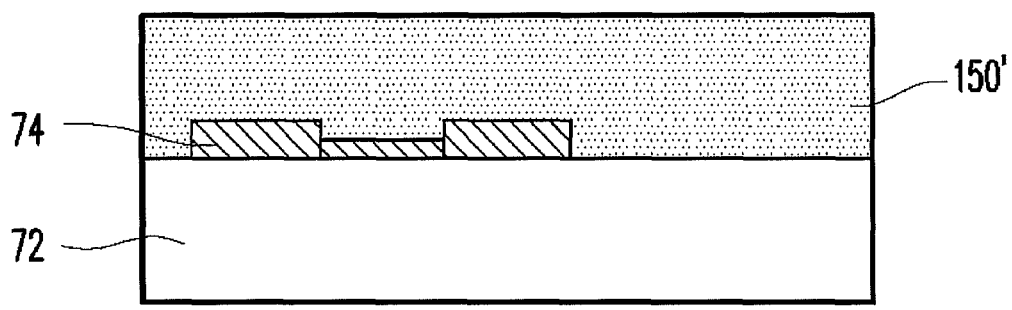
Figure 7D:
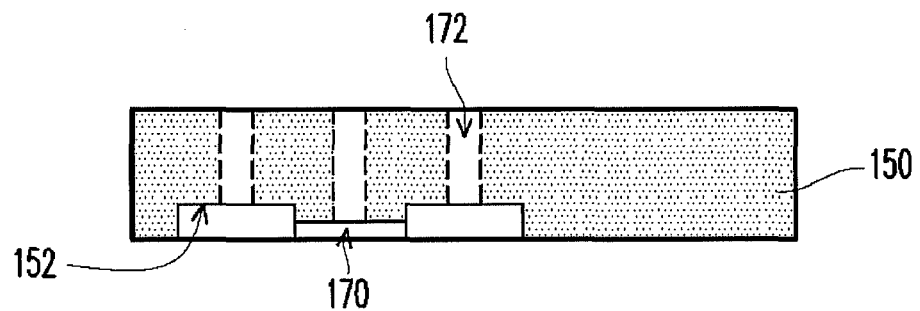

Referring to FIGS. 7C and 7D, the manufacture method of the embodiment further includes the step of forming a second container 150, which has a second space 170. In this embodiment, the step of forming the second container 150 includes the following steps. First, as shown in FIG. 7C, a second substrate 72 is provided. In this embodiment, the second substrate 72 is, for example, a silicon substrate. However, the second substrate 72 can also be made of other proper materials. Next, a second patterned structure 74 is formed on the second substrate 72. In this embodiment, the material of the second patterned structure 74 includes photoresist materials. In practice, a photoresist layer is applied on the entire surface of the second substrate 72, and then the photoresist layer is processed by photolithograph and developing processes to form the second patterned structure 74 with the preset pattern. After that, a second material layer 150' is applied on the second substrate 72 and covers the second patterned structure 74. Then, the second material layer 150' is solidified to form the second container 150 (see FIG. 7D). The second container 150 has a second recess 152 corresponding to the second patterned structure 74. In other words, the second recess 152 and the second patterned structure 74 can match and compensate to each other.

Next, as shown in FIG. 7D, the second container 150 is departed from the second substrate 72 and the second patterned structure 74. In this embodiment, after the second patterned structure 74 is formed on the second substrate 72 and before the second material layer 150' is applied on the second substrate 72, a surface treatment can be applied to the second substrate 72 and the second patterned structure 74, so that the second container 150 can be easily departed from the second substrate 72 and the second patterned structure 74 in the step referring to FIG. 7D. In one embodiment, the surface treatment is for example a silanization process. In this embodiment, the second recess 170 includes the second recess 152.

In this embodiment, after the second material layer 150' is solidified, a through hole 172 communicating with the second recess 152 is formed in the second container 150 (e.g. FIG. 7D shows a plurality of through holes 172). The through holes 172 are configured as the ionic liquid injection holes.

Figure 7E:
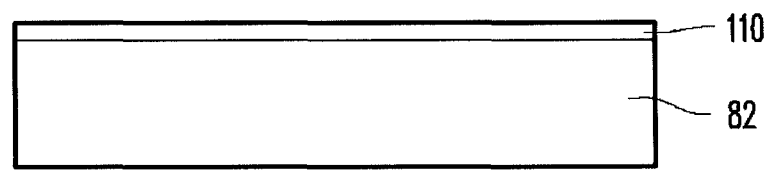

With reference to FIG. 7E, the manufacture method of the embodiment further includes the step of forming a flexible film 110. In specific, a substrate 82, such as a silicon substrate or other proper substrates, is provided. Then, a flexible film 110 is formed on the substrate 82 by spin coating. Moreover, the thickness of the flexible film 110 can be controlled by adjusting the rotating speed of the spin coating.

Figure 7F:
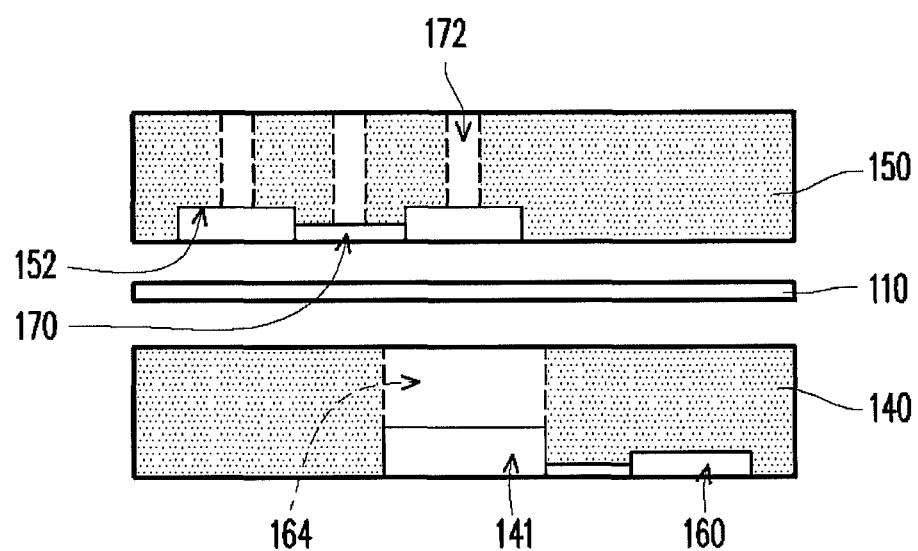

With reference to FIG. 7F, the first container 140 and the second container 150 are respectively connected to two opposite sides of the flexible film 110, while the first space 160 and the second space 170 are respectively communicated with two opposite sides of the flexible film 110 (see FIG. 2). Referring to FIG. 2, the second space 170 is filled with ionic liquid to form the liquid electronic device 120 and the liquid electrical circuit 130, which connects to the liquid electronic device 120. In this case, the liquid electronic device 120 is formed on the flexible film 110. After connecting the first container 140 and the second container 150 to the two opposite sides of the flexible film 110, the second end E2 of the through hole 164 can communicate with the flexible film 110. Moreover, in this embodiment, the step of filling the ionic liquid into the second space includes the step of injecting the ionic liquid into the second recess 152 through the through hole 172 (or the ionic-liquid injection hole).

Referring to FIG. 2, the first container 140 may be further connected to a third substrate 95. In this case, the third substrate 95 and the first recess 141 define at least part of the first space 160. Besides, the third substrate 95 and the first recess 141 can define the channel of the fluid 90. Consequently, the desired measurement system 100 is finished. In this embodiment, the third substrate 95 is for example a glass substrate. However, in other embodiments, the third substrate 95 can be made of other materials.

The manufacture method of the embodiment is to fill the ionic liquid into the second space 170 so as to form the measurement system 100, so that the measurement system 100 of the embodiment can have higher stability and can be operated for long term.

With reference to FIGS. 1 and 2, after connecting the first container 140 and the second container 150 to the two opposite sides of the flexible film 110, at least one through hole 180 can be formed (FIG. 1 shows two through holes 180). The through hole 180 passes through the second container 150 and the flexible film 110, and is communicated with the first space 160. In this embodiment, the through hole 180 is used as the injection hole of the fluid 90. In another embodiment, which configures two through holes 180, one through hole 180 is configured as the injection hole of the fluid 90, and the other through hole 180 is configured as the outlet of the fluid 90. In this case, the fluid 90 can dynamically and continuously flow in and out of the measurement system 100. In other words, the measurement system 100 can dynamically monitor the fluid 90.

Figure 8:
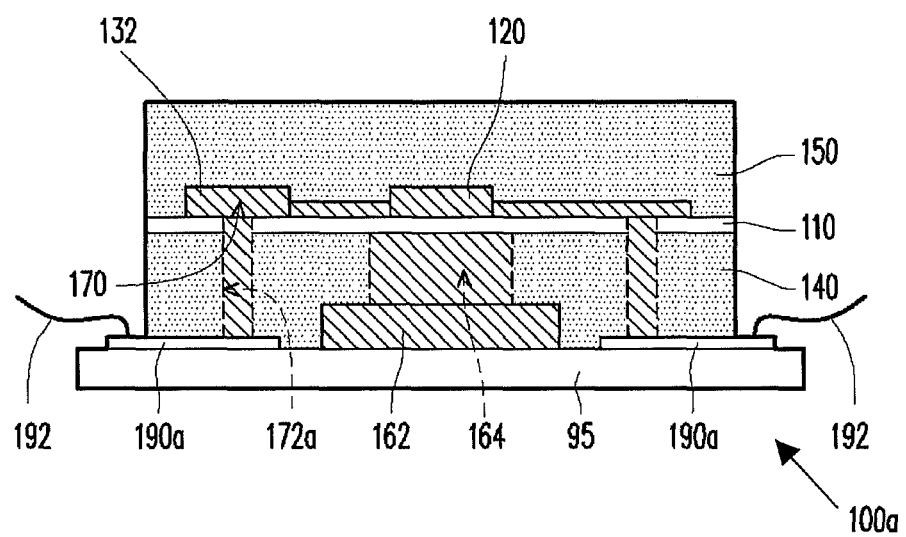
FIG. 8 is a cross-section view showing a measurement system according to another embodiment of the present invention.

FIG. 8 is a cross-section view showing a measurement system according to another embodiment of the present invention. With reference to FIG. 8, the measurement system 100a is similar to the measurement system 100 of FIGS. 1 and 2, and their difference will be described hereinbelow. In the measurement system 100a, the through hole 172a is different from the through hole 172, which is disposed in the second container 150. As shown in FIG. 8, the through hole 172a passes through the flexible film 110 and the first container 140, and is communicated with the second space 170. In this embodiment, the electrodes 190a can be configured underneath the first container 140 and the second container 150 (e.g. lay between the first container 140 and the third substrate 95). This configuration can increase the throughput and the reliability of the products. In this embodiment, the electrodes 190a are coupled to the applied voltage $V_S$ and the voltmeter $V_M$ as shown in FIG. 1. In an alternative embodiment, the third substrate 95 can be a circuit board, and the electrodes 190a are coupled to the layout of the circuit board and then coupled to the applied voltage $V_S$ and the voltmeter $V_M$.

In summary, the measurement system of the invention is configured with a liquid electronic device and a liquid electrical circuit. Since the characteristics of the liquid electronic device and liquid electrical circuit are not affected by the temperature variation relatively, the measurement system of the invention has better stability, which makes the long-term operation of the measurement system possible. In addition, the manufacture method of the measurement system of the invention includes the step of filling the ionic liquid into the second space, so that the measurement system with higher stability and capable of long-term operation is available.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A measurement system for measuring a pressure of a fluid, comprising:
    a sensing module comprising:
    a flexible film having a first side and a second side opposite to the first side, wherein the fluid is disposed on the first side of the flexible film, and
    a liquid electronic device disposed on the second side of the flexible film, wherein the flexible film converts the pressure of the fluid into a parameter of the liquid electronic device; and
    a liquid electrical circuit electrically coupled to the liquid electronic device, wherein the liquid electronic device and the liquid electrical circuit output a measurement signal corresponding to the parameter in response to an applied electrical energy.

2. The measurement system of claim 1, wherein the liquid electronic device comprises an ionic liquid.

3. The measurement system of claim 1, wherein the liquid electrical circuit comprises an ionic liquid.

4. The measurement system of claim 1, wherein the liquid electronic device and the liquid electrical circuit output the measurement signal corresponding to the parameter in response to an applied voltage, and the liquid electronic device and the liquid electrical circuit form a closed loop.

5. The measurement system of claim 4, wherein the applied voltage is an alternating voltage.

6. The measurement system of claim 4, wherein the liquid electronic device and the liquid electrical circuit form a Wheatstone bridge.

7. The measurement system of claim 6, wherein the liquid electrical circuit comprises:
    a first liquid resistance device electrically coupled to the liquid electronic device;
    a second liquid resistance device electrically coupled to the first liquid resistance device; and
    a third liquid resistance device electrically coupled between the liquid electronic device and the second liquid resistance device, wherein the liquid electronic device is a fourth liquid resistance device, the voltage is applied between a first node and a second node, the first node is coupled between the first liquid resistance device and the fourth liquid resistance device, the second node is coupled between the second liquid resistance device and the third liquid resistance device, the measurement signal corresponds to the voltage difference between a third node and a fourth node, the third node is coupled between the first liquid resistance device and the second liquid resistance device, and the fourth node is coupled between the third liquid resistance device and the fourth liquid resistance device.

8. The measurement system of claim 7, wherein the first liquid resistance device, the second liquid resistance device, the third liquid resistance device, and the fourth liquid resistance device have a circuitous configuration.

9. The measurement system of claim 1, wherein the pressure of the fluid causes a deformation of the flexible film, the deformation of the flexible film causes a deformation of the liquid electronic device, the parameter of the liquid electronic device is a resistance value of the liquid electronic device, and the deformation of the liquid electronic device causes a change of the resistance value of the liquid electronic device.

10. The measurement system of claim 1, further comprising:
    a first container disposed on the first side of the flexible film and having a first space for accommodating the fluid; and
    a second container disposed on the second side of the flexible film and having a second space for accommodating the liquid electronic device and the liquid electrical circuit.

11. The measurement system of claim 10, wherein the first space comprises:
    a channel for accommodating the fluid; and
    a through hole having a first end and a second end opposite to each other, wherein the first end is communicated with the channel, the second end is communicated with the flexible film, and the fluid flows through the through hole and applies the pressure to the flexible film.

12. A manufacture method of a measurement system, comprising steps of:
    forming a first container having a first space;
    forming a second container having a second space;
    forming a flexible film, wherein the first container and the second container are connected to two opposite sides of the flexible film such that the first space and the second space are communicated with the two opposite sides of the flexible film; and
    filling an ionic liquid in the second space to form a liquid electronic device and a liquid electrical circuit electrically coupled with the liquid electronic device, wherein the liquid electronic device is disposed on the flexible film.

13. The manufacture method of claim 12, wherein the step of forming the first container comprises:
    providing a first substrate;
    forming a first patterned structure on the first substrate;
    applying a first material layer on the first substrate to covering the first patterned structure;
    solidifying the first material layer to form the first container, wherein the first container has a first recess disposed corresponding to the first patterned structure; and
    departing the first container from the first substrate and the first patterned structure, wherein the first space comprises the first recess.

14. The manufacture method of claim 13, further comprising a step of:
- connecting the first container to a third substrate, wherein the third substrate and the first recess define at least part of the first space.

15. The manufacture method of claim 14, wherein the third substrate and the first recess define a channel of a fluid.

16. The manufacture method of claim 14, wherein the step of forming the first container further comprises:
- forming a through hole on the first container for connecting to the first recess after solidifying the first material layer, wherein the through hole has a first end and a second end opposite to each other, the first end is communicated with the first recess, and the second end is communicated with the flexible film after the first container and the second container are connected to the two opposite sides of the flexible film.

17. The manufacture method of claim 12, wherein the step of forming the second container comprises:
- providing a second substrate;
- forming a second patterned structure on the second substrate;
- applying a second material layer on the second substrate to covering the second patterned structure;
- solidifying the second material layer to form the second container, wherein the second container has a second recess disposed corresponding to the second patterned structure; and
- departing the second container from the second substrate and the second patterned structure, wherein the second space comprises the second recess.

18. The manufacture method of claim 17, wherein the step of forming the second container further comprises:
- forming at least one ionic-liquid injection hole on the second container for connecting to the second recess after solidifying the first material layer, wherein the step of filling the ionic liquid in the second space comprises injecting the ionic liquid into the second recess through the ionic-liquid injection hole.

19. The manufacture method of claim 12, further comprising a step of:
- forming at least a through hole after the first container and the second container are connected to the two opposite sides of the flexible film, wherein the through hole passes through the second container and the flexible film, and is communicated with the first space.

* * * * *